United States Patent [19]
Devic

[11] Patent Number: 5,219,601
[45] Date of Patent: Jun. 15, 1993

[54] TWO-STEP BLEACHING OF PLANT MATERIALS

[75] Inventor: Michel Devic, Ste Foy les Lyon, France

[73] Assignee: Elf Atochem S.A., Puteaux, France

[21] Appl. No.: 850,127

[22] Filed: Mar. 12, 1992

[30] Foreign Application Priority Data

Mar. 15, 1991 [FR] France ................... 91 03176

[51] Int. Cl.$^5$ ............................................. A23L 1/277
[52] U.S. Cl. ................................... 426/254; 426/258
[58] Field of Search ................ 426/254, 255, 258, 271

[56] References Cited

U.S. PATENT DOCUMENTS

| | | | |
|---|---|---|---|
| 4,246,289 | 1/1981 | Tu | 426/254 |
| 4,844,924 | 7/1989 | Stanley | 426/258 |
| 4,919,952 | 4/1990 | Sadaranganey et al. | 426/254 |
| 4,997,488 | 3/1991 | Gould et al. | 426/254 |

FOREIGN PATENT DOCUMENTS

| | | | |
|---|---|---|---|
| 0402280 | 12/1990 | European Pat. Off. | |
| 0118534 | 10/1978 | Japan | 426/254 |
| 8402366 | 6/1984 | PCT Int'l Appl. | |

OTHER PUBLICATIONS

World Patents Index, Section Ch, Week 20 (1980), Derwent Publications Ltd., London, GB; Class F, AN 80-35388C(20) & JP-A-55 045 806 (OJI Paper), Apr. 1, 1980.

World Patents Index, Section Ch, Week 30 (1976), Derwent Publicaitons Ltd., London, GB; Class D, AN 76-56985X(30) & JP-A-51 067 740 (Seiwa Kasei), Jun. 12, 1976.

*Primary Examiner*—Jeanette Hunter
*Attorney, Agent, or Firm*—Burns, Doane, Swecker & Mathis

[57] ABSTRACT

A variety of plant materials adopted for processing into, e.g., low-calorie vegetable fibers and dietary flours, are bleached by (1) prebleaching such plant material in a first aqueous solution containing an alkaline agent and hydrogen peroxide, the alkaline agent being present in solution in such amount that the final pH of the resulting suspension is no greater than 9, (2) filtering and washing the suspension produced in step (1) with water, to an effectiveness of at least 50%, (3) bleaching the material obtained after step (2) in a second aqueous solution containing an alkaline agent and hydrogen peroxide, the alkaline agent being present in solution in such amount that the final pH of the resulting suspension is no greater than 8.5, and, characteristically, (4) filtering and washing the suspension produced in step (3) with water.

20 Claims, No Drawings

TWO-STEP BLEACHING OF PLANT MATERIALS

CROSS-REFERENCE TO COMPANION APPLICATION

My copending application Ser. No. 07/850,312, filed concurrently herewith and assigned to the assignee hereof.

BACKGROUND OF THE INVENTION

1. Field of the Invention

The present invention relates to the bleaching of plant materials destined for nutritional consumption by means of hydrogen peroxide in an alkaline aqueous solution to enhance the whiteness thereof.

Exemplary plant materials which can be bleached according to the invention include brans of oil plants such as sunflowers, brans of cereals such as wheat, maize, oats, barley or whole cereal grains; it is also envisaged to bleach pulps originating from various products such as beet or sugar beet, citrus fruit, for example lemon, fruits such as pears, peaches, apples, apricots, oil plants such as sunflowers, soya beans, cereals, and pulps which originate from the extraction of the fraction which usually enhances the value of such products, namely, sugar, fruit juice, pectin, oil or starch.

2. Description of the Prior Art

Plant materials of the above type are typically treated with alkaline aqueous solutions containing hydrogen peroxide for purposes of "delignifying" and bleaching them.

Such bleached plant materials have a high plant fiber content and can be used, in particular, for producing edible food products and, especially, low-calorie food products, for example dietary flours.

However, the food products obtained from these fibers have too dark a color to permit them to be used as flour substitutes.

A number of techniques have been proposed to this art to obviate this shortcoming. Thus, French Patent No. 2,382,866 (Bayer) describes the bleaching of a beet pulp suspension by treatment with an alkaline hydrogen peroxide solution at a pH of 9.5 to 10, followed by filtration, washing and drying. U.S. Pat. No. 4,649,113 to Gould describes the treatment of plant fibers for nutrition, in suspension at room temperature, with an alkaline hydrogen peroxide solution having a pH maintained between 11.2 and 11.8. This treatment at ambient temperature and at a controlled pH permits effective "delignification." The treatment of plant materials as described in the above patents, solely with an alkaline hydrogen peroxide solution, does not enable products of satisfactory whiteness to be obtained as a result of the rapid decomposition of the peroxide on contact with impurities contained in the plant fibers.

To obtain plant materials having a higher degree of whiteness, French Patent No. 2,647,641 describes subjecting the plant material to an acid pretreatment, followed by washing, prior to carrying out the bleaching treatment.

EP-A-337,653 describes pretreating the plant material with an alkaline solution, followed, if appropriate, by washing, before adding the hydrogen peroxide. The pretreatment is conducted in the absence of hydrogen peroxide and at a pH of between 10 and 13 and a temperature of greater than 25° C. For the bleaching phase, the plant material is maintained in contact with the peroxide solution at a pH of 9.5 to 11.0 at a temperature of greater than 25° C., for a sufficiently long time to produce bleached fibers. The bleached material is neutralized with an acid before drying.

This process permits lignocellulosic plant materials to be converted into useful fibrous cellulosic products, in particular into low-calorie materials which are suitable for human consumption.

The alkaline pretreatment permits a large number of impurities to be eliminated, but entails yellowing of the lignocellulosic material of the plant fiber.

SUMMARY OF THE INVENTION

Accordingly, a major object of the present invention is the provision of improved technique for the bleaching of plant substrates destined for the production of food products, especially low-calorie foodstuffs, for example dietary flours, to impart a higher degree of whiteness thereto.

Briefly, the present invention features the bleaching of plant materials via an alkaline pretreatment and subsequent treatment with an alkaline aqueous solution containing hydrogen peroxide, comprising:

(1) pretreating the plant material substrate with an alkaline aqueous hydrogen peroxide solution, the alkaline agent being present in an amount such that the pH of the resulting suspension does not exceed 9 at the end of the pretreatment, (2) filtering and washing the suspension obtained in step (1) with water, to an effectiveness of at least 50%, (3) treating the material obtained in (2) with an alkaline aqueous hydrogen peroxide solution, the alkaline agent being present in an amount such that the pH of the resulting suspension does not exceed 8.5 at the end of the treatment, and (4) filtering and washing the plant material thus treated with water.

DETAILED DESCRIPTION OF THE PREFERRED EMBODIMENTS OF THE INVENTION

More particularly according to the present invention, the first step of the bleaching process is the alkaline pretreatment in the presence of hydrogen peroxide. This step is tantamount to a first bleaching step.

Representative plant materials which can be treated according to the invention are those indicated above, namely, whole cereal grains, brans of oil plants, of cereals, or else pulps obtained after extracting the portion which enhances the value of the materials, such as beet, citrus fruit, fruits, oil plants and cereals. The plant materials are preferably coarsely crushed to favor the subsequent treatments.

In this first step, the plant material is employed in the form of an aqueous suspension whose consistency is thin enough to permit thorough stirring of the suspension. It preferably ranges from 2% to 40% and, more preferably, from 10% to 15%. The consistency is equivalent to the percentage by weight of dry plant material in the suspension. In reality the consistency is not critical for carrying out the process of the invention. It depends on the water retention capacity of the plant material, which is equivalent to the weight of water absorbed relative to the weight of wet, drained material, and is expressed as a percentage.

The plant material is suspended in hot water, for example at 80° to 90° C., and is stirred vigorously for a short period of time to suspend the insoluble impurities.

The plant material is ultimately directly suspended in the alkaline aqueous solution containing hydrogen peroxide, which is used for the pretreatment.

Any suitable compound can be used as the alkaline agent, in particular sodium hydroxide, potassium hydroxide, sodium carbonate, potassium carbonate, calcium oxide CaO, or magnesium oxide MgO. Sodium hydroxide is preferably used.

The alkaline agent is added in such an amount that the pH at the end of the pretreatment is below 9, preferably ranging from 7 to 8. For example, when the alkaline agent is sodium hydroxide, an amount of less than 10% by weight relative to the dry plant material is generally employed, and preferably an amount of less than 3% by weight.

The temperature at which the pretreatment is carried out depends on the nature of the plant material to be treated. It generally ranges from 20° to 100° C., approximately, and, preferably, from about 60° to 90° C.

The pretreatment time has to be of sufficient length to permit complete impregnation of the plant material with the hydrogen peroxide solution. This time depends on the temperature, on the nature of the plant material and on the effectiveness with which the aqueous suspension is stirred. The pretreatment time is generally less than 2 hours. When the pretreatment is carried out at about 90° C., such time preferably ranges from about 15 to 30 minutes.

According to the present invention, the alkaline aqueous solution used for the pretreatment contains hydrogen peroxide, in amounts advantageously ranging from 0.1% to 5% by weight, relative to the weight of the dry plant material solids to be treated and, preferably, ranges from 1% to 3%. The hydrogen peroxide can optionally originate from a recycling of the filtrate obtained by filtering the material after bleaching.

In addition, the alkaline solution used for the pretreatment can contain one or more hydrogen peroxide stabilizing agent(s) and/or (a) complexing or sequestering agent(s) for metal ions, these agents being suitable/compatible for the production of edible comestibles. Such stabilizing agents can be sodium silicate, magnesia, soluble magnesium salts such as the chloride or the sulfate; exemplary complexing agents include sodium polyphosphates such as sodium tripolyphosphate or pyrophosphoric acid derivatives such as sodium tetrapyrophosphate. These compounds are used in amounts of less than 1% by weight relative to the dry plant material.

An emulsifier or detergent which is also compatible with use in nutrition can be added during the pretreatment to improve the elimination of colored impurities during filtration. These compounds are used in amounts of less than 1% by weight relative to the weight of the dry plant material.

The second step of the process according to the invention is the filtration and washing of the plant material suspension obtained after the pretreatment.

The filtration, which is carried out after the pretreatment has been completed, is preferably effected over a filter or in a screw press where the filtering element includes a stainless metal cloth of mesh size 50 μm to 1 mm, depending on the particle size of the material used. During the filtration, stirring is desirable such as to maintain the impurities in suspension and unblock the filtering element, and the temperature is the temperature of the suspension at the end of the pretreatment.

After the filtration, the plant material is washed with hot or cold water, preferably with water at 60° C., until a clear, colorless filtrate is obtained.

The washing "effectiveness" must exceed 50%. By "effectiveness" is intended the weight of the aqueous phase eliminated by washing relative to the weight of the aqueous phase before washing. The effectiveness is expressed as a percentage. Washing is preferably carried out at an effectiveness of not less than 90%.

The third step of the process according to the invention is a bleaching phase. The plant material obtained after washing in step (2) is suspended in water until the desired consistency is obtained, which can range from 2% to 40% depending on the nature of the material. It preferably ranges from 10% to 20%. The consistency is selected depending upon the type of apparatus used for soaking the material with the hydrogen peroxide solution.

The hydrogen peroxide is used in a proportion of 1% to 15% by weight relative to the weight of the dry plant material, preferably from 5% to 10%.

The alkaline agent used can be those indicated above, preferably sodium hydroxide. The alkaline agent is used in an amount such as is necessary for the pH to be not more than 8.5 at the end of the bleaching, preferably about 7. When the alkaline agent is sodium hydroxide, it is used in an amount ranging from 0.2% to 5%, depending on the nature of the plant material, and preferably from 1% to 2% by weight relative to the weight of dry plant material.

The alkaline solution can optionally contain a hydrogen peroxide stabilizing agent such as those indicated above. When magnesium, in the form of magnesia or of a soluble salt (chloride, sulfate) is used as the stabilizing agent, then the amount thereof is not more than 1% by weight (relative to the weight of the dry plant material). When the stabilizing agent is sodium silicate in the form of an aqueous solution having a density of 1.33, it is used in amounts of not more than 5% by weight.

The alkaline solution can also optionally contain one or more complexing or sequestering agents for metal ions. These compounds, as well as the amounts thereof, are as indicated above in the case of the alkaline pretreatment solution.

The bleaching step is advantageously carried out at a temperature of from 40° to 100° C., preferably from 60° to 90° C.

In general, the plant material is heated to the temperature at which bleaching is carried out before the hydrogen peroxide is added. The bleaching time varies depending on the nature of the plant material and of the amount of hydrogen peroxide added. This time typically ranges from 15 minutes to 5 hours, preferably from 1 hour to 2 hours, at 80° C.

The fourth step of the process according to the invention comprises the filtration and washing of the bleached plant material.

At the end of the bleaching step, the residual hydrogen peroxide is eliminated by filtration and washing with water and/or by treating the plant material with an enzyme solution, for example catalase, which decomposes the peroxide.

When filtering and washing are effected, the filtrates and the first washing liquors, which contain hydrogen peroxide (approximately 10% to 60% by weight of the initial amount of peroxide) can be recovered and recycled for use in the pretreatment step, if necessary after purification by the usual means (filtration, decanting, centrifugation, etc.). This recycling of the filtrates presents the advantage of reducing production costs and also reducing the amount of effluents.

The plant material which has been bleached in this manner can be dried according to conventional techniques in the food industry and, if appropriate, ground to provide a flour which is suitable for nutritional purposes.

The alkaline pretreatment without hydrogen peroxide permits a large number of impurities to be eliminated. The process according to the invention exhibits the advantage of increasing the effectiveness of such pretreatment by preventing yellowing of the lignocellulosic material which results from this alkaline pretreatment, using small amounts of hydrogen peroxide. Moreover, the process of the invention enables the bleached material to be obtained at a neutral or slightly acidic pH, which avoids the step of neutralization with an acid, a step generally employed in the manufacture of bleached plant material.

The process according to the invention essentially consists of two bleaching steps separated by a filtration and washing step, the pH being monitored during these steps. Surprisingly, it has now been determined, using a given total amount of hydrogen peroxide, that it is possible to obtain a product having a higher degree of whiteness when bleaching is carried out in two steps rather than in a single step, as shown in the examples below.

In order to further illustrate the present invention and the advantages thereof, the following specific examples are given, it being understood that same are intended only as illustrative and in nowise limitative.

In said examples to follow, the amounts of the chemical reactants are expressed as percentages by weight relative to the dry plant material.

Also in said examples to follow, the degree of whiteness before or after bleaching was measured by means of a reflectometer (at 457 nm) following the ISO standard of the paper industry, and is expressed in ISO degrees.

EXAMPLE 1

168 g of crushed sunflower bran (150 g dry weight) were suspended in 582 g of an aqueous solution, heated at 90° C., such as to provide a consistency of 20%. The solution also contained 2% of hydrogen peroxide and 1% of NaOH. After 15 minutes of stirring at 90° C., the pH was 7.5. The mixture was filtered and washed with 1 l of water, with an effectiveness of approximately 90%.

The moist precipitate was suspended in 560 g of water to provide a consistency of 15% and heated to 80° C. 5% of $H_2O_2$ and 1% of NaOH were added. The suspension was stirred for 1 hour at 85° C. The pH at the end of the treatment was 6.4. The mixture was filtered and washed with water. This provided 725 g of filtrate of a pH of 6.4, containing 2.7% of $H_2O_2$. The precipitate was washed several times with water and then dried at 70° C.

135 g of dry sunflower bran having a whiteness of 52° ISO (initial whiteness 32.8° ISO) and a residual $H_2O_2$ content of less than 20 ppm were obtained. The yield by weight was 90.2%.

EXAMPLE 2 (Comparative)

In this example, the plant material was not subjected to an alkaline pretreatment in the presence of $H_2O_2$.

56 g of crushed sunflower bran (50 g dry weight), the quality of which was identical to that in Example 1, were suspended in 250 cm$^3$ of water, heated at 80° C., such as to provide a consistency of 14%. 7% of $H_2O_2$ and 2% of NaOH were added. The pH after one hour of stirring at 85° C. was 7.5. The mixture was filtered and washed and the product was dried at 70° C.

44.5 g of sunflower bran (dry weight 44.5 g) having a whiteness of 49.6° ISO (initial whiteness 32.8° ISO) were obtained. The yield by weight was 89%.

It will thus be seen that, for a given total amount of reactant, $H_2O_2$, the bleaching carried out in a single step was less effective.

EXAMPLE 3 (Comparative)

In this example, the plant material was subjected to an alkaline pretreatment in the absence of $H_2O_2$.

56 g of crushed sunflower bran (50 g dry weight), the quality of which was identical to that in Example 1, were suspended in 300 cm$^3$ of an aqueous solution containing 10% of NaOH, such as to provide a pH of 12.5. The consistency was 15%. The pH after 15 minutes of stirring at 90° C. was 10. The mixture was filtered and washed with 350 cm$^3$ of water.

The moist precipitate was suspended in 194 cm$^3$ of water such as to provide a consistency of 15% and heated to 80° C. 7% of $H_2O_2$ and 3.4% of NaOH were added such as to provide an initial pH of 11. The pH after 1 hour of stirring at 85° C. was 10.4. The mixture was washed to neutrality and dried.

36 g of dry sunflower bran having a whiteness of 45.4° ISO (initial whiteness 32.8° ISO) were obtained. The yield by weight was 72%.

It will thus be seen that the alkaline pretreatment in the absence of $H_2O_2$ was less effective for a given total amount of $H_2O_2$.

EXAMPLE 4

(1) Alkaline Pretreatment in the Presence of $H_2O_2$

A 100 l stainless-steel reactor was charged with 80 l of water at 80° C., 14 kg of ground sunflower bran (12.3 kg dry weight), 1.25 kg of a 10% strength aqueous solution of NaOH and 0.714 kg of a 35% strength aqueous solution of $H_2O_2$. The consistency of the mixture was 13%.

The mixture was stirred rapidly for 15 minutes at 80° C. The pH of the mixture at the end of the pretreatment was 7.8.

(2) Filtration/Washing

The filtration was carried out on a stirred filter consisting of a stainless-steel cloth of mesh size 200 μm and having an effective surface of 0.24 m$^2$. The mixture was washed, with stirring, with 200 l of water, with an effectiveness of 90% approximately.

(3) Bleaching in Alkaline Solution

In the 100 l reactor, the precipitate was resuspended with water at 80° C. at a consistency of 15%. Then, 1.22 kg of a 10% strength aqueous NaOH solution and 1.74 kg of 35% strength aqueous $H_2O_2$ solution were added. The mixture was stirred for 1 hour at 80° C. The pH at the end of the bleaching step was 6.95.

(4) Isolation or Separation of the Bleached Sunflower Bran

The filtration was carried out on a stirred filter consisting of a stainless-steel cloth of mesh size 200 μm and having an effective surface of 0.24 m$^2$.

The mixture was washed with a small amount of water to provide 80 l of a filtrate having a pH of 7 and which contained 0.31 kg of pure $H_2O_2$, namely, 0.88 kg of 35% strength $H_2O_2$.

This filtrate could be used without further treatment for the pretreatment (step 1 of the process according to the invention) without the necessity for adding hydrogen peroxide.

The precipitate was washed again with 500 l of water and then dried at 70° C.

This provided 12.05 kg of bleached sunflower bran (dry weight: 11.26 kg) having a pH of 6.9 and a residual $H_2O_2$ content of less than 10 ppm, the yield by weight being 91.5%.

The whiteness of the treated product was 52.5° ISO. Before treatment, the whiteness of the plant material was 32.2° ISO.

EXAMPLE 5

The procedure of Example 4 was repeated, except that the temperature of steps (1) and (3) was 90° C. instead of 80° C.

The yield by weight was then 86.5%, the pH was 6.8 and the whiteness was 53.5° ISO.

EXAMPLE 6

57.5 g of soya bean fiber after extraction of the oil, having a dry weight of 50 g, were suspended in 300 cm$^3$ of water, heated at 90° C., and containing 2% of $H_2O_2$ and 1% of NaOH. The consistency of the suspension was 12%.

After 15 minutes of stirring at 90° C., the pH of the suspension was 8.2.

The mixture was filtered and washed with 500 cm$^3$ of water at 60° C., with an effectiveness of 95%, approximately.

The moist precipitate, which had a weight of 182 g, was suspended in 220 g of water at 80° C. which contained 10% of $H_2O_2$ and 1% of NaOH, such as to provide a consistency of 10%.

The mixture was stirred for 30 minutes at 85° C. The pH of the suspension was 7.7. The mixture was filtered and washed with 300 cm$^3$ of water, and the product was dried at 70° C.

This provided 36.6 g of bleached dry soya bean fiber having a whiteness of 40.2° ISO. The whiteness of the fiber before treatment was 29° ISO.

EXAMPLE 7 (Comparative)

In this example, the bleaching was carried out in a single step.

57.5 g of soya bean fiber, identical to that used in Example 6, having a net weight of 50 g, were suspended in 300 cm$^3$ of water, heated at 80° C., and containing 12% of $H_2O_2$ and 2% of NaOH. The consistency was 12%.

The mixture was stirred for 30 minutes at 85° C. The pH of the suspension at the end of the treatment was 8.1.

The mixture was filtered and washed with 300 cm$^3$ of water, and the product was then dried at 70° C.

This provided 39.5 g of bleached dry soya been fiber having a whiteness of 33.2° C. ISO.

It will thus be seen that, for a given total amount of reactant, $H_2O_2$, the bleaching was more effective in two steps than in a single step.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the bleaching of plant material, comprising (1) prebleaching such plant material in a first aqueous solution containing an alkaline agent and hydrogen peroxide, said alkaline agent being present therein in such amount that the final pH of the resulting suspension is no greater than 9, (2) filtering and washing the suspension produced in step (1) with water, to an effectiveness of at least 50%, and (3) bleaching the material obtained after step (2) in a second aqueous solution containing an alkaline agent and hydrogen peroxide, said alkaline agent being present therein in such amount that the final pH of the resulting suspension is no greater than 8.5.

2. The process as defined by claim 1, further comprising (4) filtering and washing the suspension produced in step (3) with water.

3. The process as defined by claim 1, said step (1) being carried out at a temperature ranging from 20° to 100° C. and step (3) at a temperature ranging from 40° to 100° C.

4. The process as defined by claim 1, said first aqueous solution comprising from 0.1% to 5% by weight of hydrogen peroxide relative to the dry weight of such plant material.

5. The process as defined by claim 4, said first aqueous solution comprising from 1% to 3% by weight of hydrogen peroxide relative to the dry weight of such plant material.

6. The process as defined by claim 4, said first aqueous solution comprising less than 10% by weight of sodium hydroxide relative to the dry weight of such plant material.

7. The process as defined by claim 6, said first aqueous solution comprising less than 3% by weight of sodium hydroxide relative to the dry weight of such plant material.

8. The process as defined by claim 1, the consistency of the step (1) suspension ranging from 2% to 40%.

9. The process as defined by claim 8, the consistency of the step (1) suspension ranging from 10% to 15%.

10. The process as defined by claim 4, said second aqueous solution comprising from 1% to 15% by weight of hydrogen peroxide relative to the dry weight of such plant material.

11. The process as defined by claim 10, said second aqueous solution comprising from 5% to 10% by weight of hydrogen peroxide relative to the dry weight of such plant material.

12. The process as defined by claim 10, said second aqueous solution comprising from 0.2% to 5% by weight of sodium hydroxide relative to the dry weight of such plant material.

13. The process as defined by claim 12, said second aqueous solution comprising from 1% to 2% by weight of sodium hydroxide relative to the dry weight of such plant material.

14. The process as defined by claim 8, the consistency of the step (3) suspension ranging from 2% to 40%.

15. The process as defined by claim 14, the consistency of the step (3) suspension ranging from 10% to 20%.

16. The process as defined by claim 1, said first and second aqueous solutions comprising at least one hydrogen peroxide stabilizing agent and/or at least one complexing or sequestering agent metal ions.

17. The process as defined by claim 2, comprising treating the bleached plant material with an enzyme that decomposes hydrogen peroxide either during or subsequent to said step (4).

18. The process as defined by claim 17, said enzyme comprising catalase.

19. The process as defined by claim 2, further comprising recycling the step (4) filtrates and wash liquors to said step (1).

20. The bleached plant material product of the process as defined by claim 1.

* * * * *